May 8, 1928.

J. J. SPURGEON

PIE PLATE LIFTER

Filed Jan. 3, 1927

1,669,355

INVENTOR.
Jesse J. Spurgeon
BY
Geo. P. Kimmel
ATTORNEY.

Patented May 8, 1928.

1,669,355

UNITED STATES PATENT OFFICE.

JESSE J. SPURGEON, OF LYMAN, OKLAHOMA.

PIE-PLATE LIFTER.

Application filed January 3, 1927. Serial No. 158,651.

The invention relates to a cooking utensil lifter, and more especially to pie plate or pan lifters.

The primary object of the invention is the provision of an implement or device of this character, wherein a cooking utensil, for example a pie plate or baking pan or the like can be conveniently lifted and transported either into the oven of a stove or onto the burners or taken from such stove, without liability of the person being burned, the device being novel in form.

Another object of the invention is the provision of a device of this character, wherein the edge or rim of a pan, plate, or the like, used as a cooking utensil, can be firmly gripped and will be prevented from slipping when the same is lifted for its transportation from one point to another, the device being readily applied to and removed from the utensil.

A further object of the invention is the provision of a device of this character, which is extremely simple in its construction, readily and easily manipulated, thoroughly reliable and efficient in its purpose, strong, durable, thoroughly capable of application and removal to and from a utensil, irrespective of the size of the same, and inexpensive to manufacture.

With these and other objects in view, the invention consists in the features of construction, combination and arrangement of parts, as will be hereinafter more fully described, illustrated in the accompanying drawing, disclosing the preferred embodiment of the invention and pointed out in the claim hereunto appended.

In the accompanying drawing:—

Similar reference characters indicate corresponding parts throughout the several views in the drawing.

Figure 1:
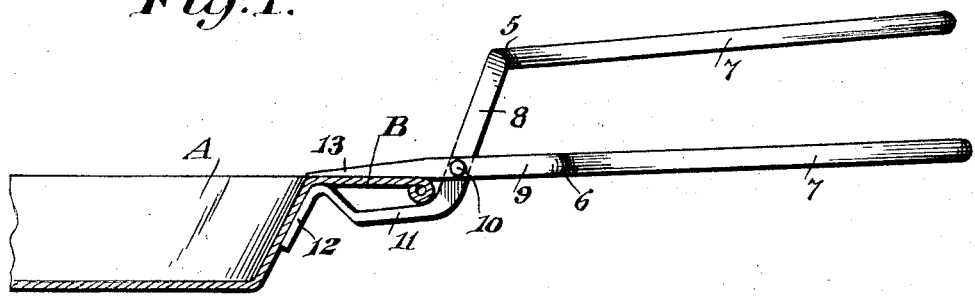
Figure 1 is a fragmentary vertical sectional view through a pie pan or plate, showing the lifter constructed in accordance with the invention applied thereto.
Figure 2:
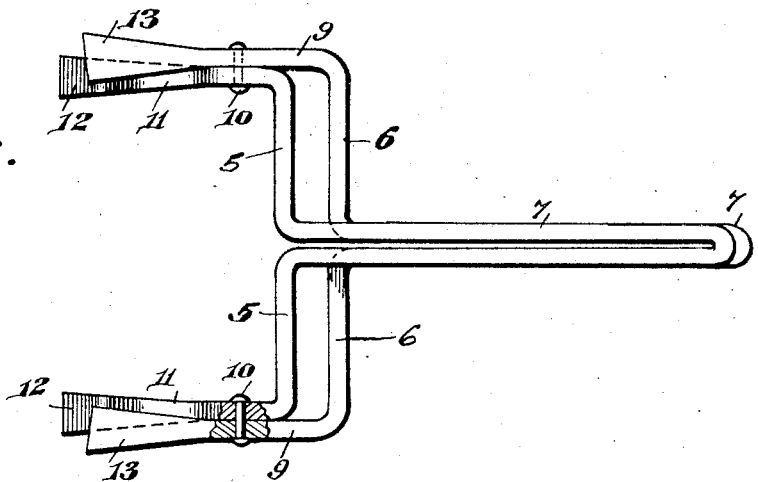
Figure 2 is a top plan view of the lifter removed from the pan or plate.
Figure 3:
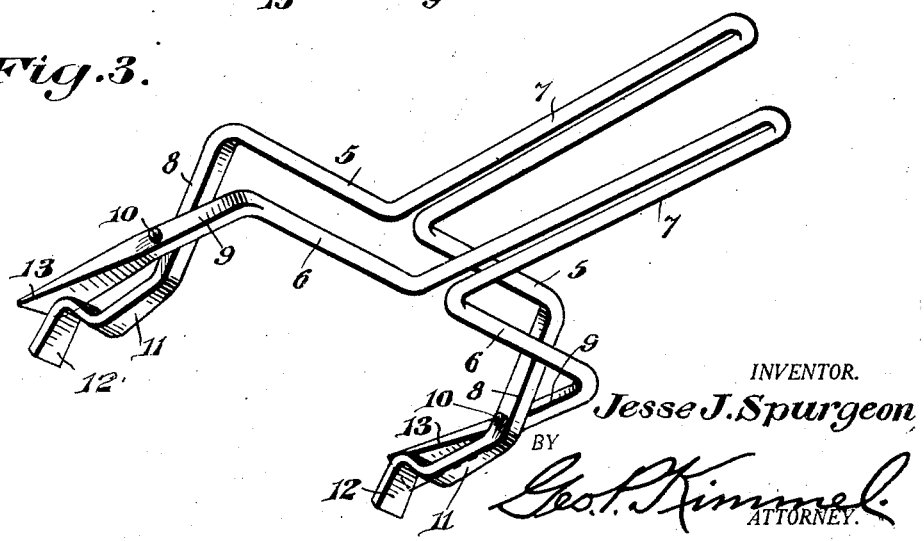
Figure 3 is a perspective view of the lifter.

Referring to the drawing in detail, A designates generally a portion of a utensil, in this instance being illustrative of a pie plate or pan having the usual marginal rim or flanged edge B, while adapted to be applied is the lifter, which will be hereinafter more fully described.

The lifter comprises a pair of substantially U-shaped frames 5 and 6, respectively, each made from a single length of bar material, in this instance of steel, although the same may be made from any other suitable material. The frame 5, as well as the frame 6, has bent medially therefrom an elongated loop-like handle 7. The frames 5 and 6 are disposed in cross relation with respect to each other and are pivotally connected to each other in a manner to be referred to.

The limbs or arms of the frame 5 are indicated at 8 and those of the frame 6 at 9. The lower end of each limb 8 merges into an angularly disposed extension 11 which provides a seat and said extension merges into an inverted V-shaped projection 12 forming a clamping jaw.

The frame 5 extends through the frame 6. Each limb 9 is pivotally connected substantially centrally thereof to the lower part of a limb 8 in proximity to the extension 11. The pivots between the arms 8 and 9 are indicated at 10. The outer portions of the limbs 9 are tapered and gradually increase in thickness and decrease in width towards the pivot 10, whereby the outer portion of the limbs 9 provide substantially triangular shaped clamping jaws 13 partly overlying the top of the inverted V-shaped projection.

The limbs 8 of the frame 5 are positioned forwardly of and are spaced from the inner ends of the limbs 9 of the inner frame 6 whereby the handle of the frame 5 is spaced a substantial distance from and above the handle 7 of the frame 6. The handles 7 extend substantially parallel to each other. The handle 7 of the frame 5 is of slightly greater length than the handle 7 of the frame 6. The substantial parallel relation of the handles 7 enable the convenient gripping thereof when the user applies the lifter to a utensil or removes the same therefrom.

The lifter is applied to a utensil as is clearly illustrated in Figure 1 of the drawing, so that the rim B will rest in the seats 11 with the jaw 12 abutting the body of the utensil A and the underface of the flange or rim B, when the jaws 13 of the frame 6 are pressed against the upper face of the flange or rim B of said utensil, so that the latter can be conveniently transported and placed at any point, without requiring a person directly handling the utensil A for the positioning of the same in an oven or upon the burners of a stove or the removal of such utensil therefrom.

The jaws 12 and 13 of the lifter can be spread apart by the swinging of the frames 5 and 6 relative to each other on manipulation of the handles 7 of said frame as will be apparent.

From the foregoing it is thought that the construction and manner of application of the lifter will be clearly understood and therefore a more extended explanation has been omitted.

What is claimed is:—

A device for the purpose set forth comprising a pair of oppositely disposed U-shaped frames, one extending through the other, means for pivotally connecting the limbs of the outer frame substantially centrally thereof to the limbs of the inner frame in proximity to the outer end thereof, said limbs of the outer frame having triangular shaped outer portions providing clamping jaws, angularly disposed extensions projecting outwardly from the outer ends of the limbs of the inner limbs and providing seats, an inverted V-shaped projection carried by the outer end of each extension and forming a clamping jaw partly overlapped by a clamping jaw of the outer frame, and handles projecting rearwardly of said frame and arranged one above the other.

In testimony whereof, I affix my signature hereto.

JESSE J. SPURGEON.